July 1, 1947.   S. C. HURLEY, JR   2,423,322
VEHICULAR LIGHT CONTROL DEVICE HAVING POLARIZING ELEMENTS
Filed Aug. 10, 1944   2 Sheets-Sheet 1

INVENTOR.
SAMUEL C. HURLEY JR.
BY Benedict & Swartwood
ATTORNEYS

July 1, 1947.  S. C. HURLEY, JR  2,423,322
VEHICULAR LIGHT CONTROL DEVICE HAVING POLARIZING ELEMENTS
Filed Aug. 10, 1944  2 Sheets—Sheet 2
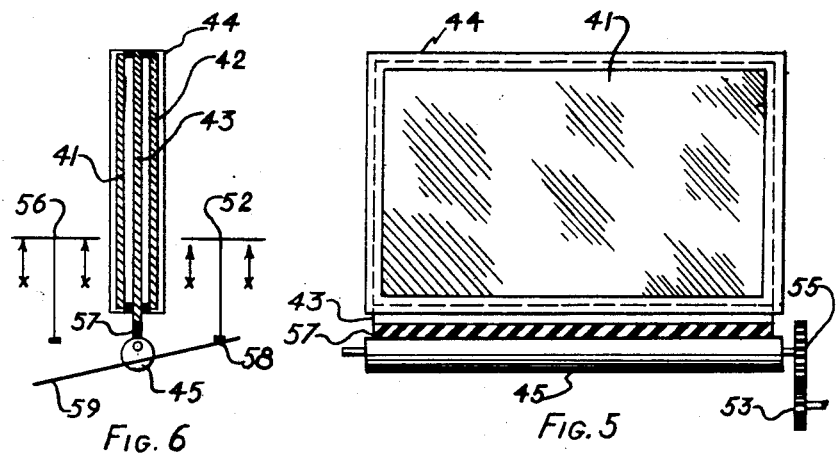
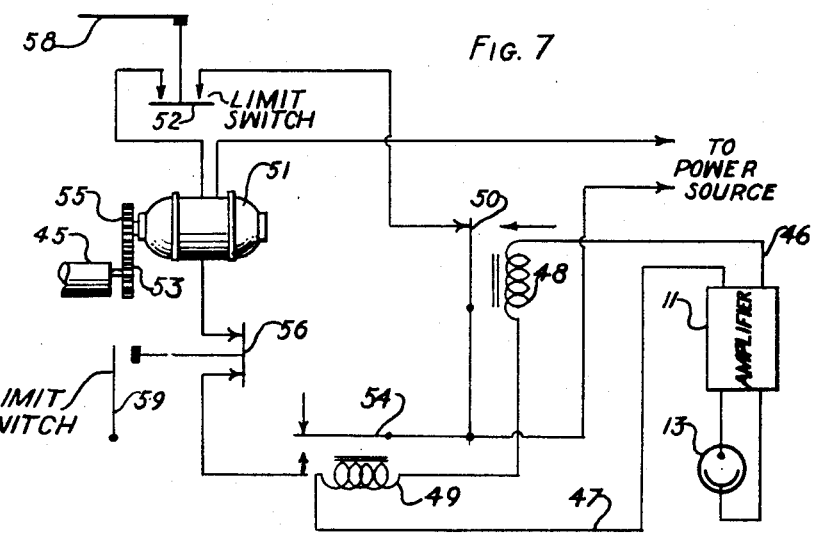
INVENTOR.
S. C. HURLEY JR.
BY Benedict & Swartwood
Attorneys Patented July 1, 1947

2,423,322

UNITED STATES PATENT OFFICE 2,423,322

VEHICULAR LIGHT CONTROL DEVICE HAVING POLARIZING ELEMENTS

Samuel C. Hurley, Jr., Danville, Ill.

Application August 10, 1944, Serial No. 549,783

3 Claims. (Cl. 88—1)

This application relates to an apparatus for controlling illumination, particularly in connection with vehicles such as automobiles, trucks, etc.

More specifically, the invention relates to an apparatus for regulating the amount of light transmitted through a viewing device and the amount of light transmitted through illuminating devices which may be associated therewith, under conditions in which extraneous illumination occurs, by the use of movable polarizing elements which may be moved into and out of phase to varying degrees by photoelectric control.

It is an object of this invention to provide a means for controlling and regulating the amount of light reaching the occupants of an automobile, truck or the like and at the same time, control and regulate the amount of light emitted by the headlights of a car so equipped.

Drivers, and, to some extent, passengers of automobiles and trucks are subjected to varying lighting conditions, some of which are not only annoying, but constitute substantial sources of danger. For example, a driver of an automobile is subjected to an inconvenient and dangerous lighting condition during the hours when the sun is low in the sky and when driving toward the sun. Most automobiles are equipped with some type of shield or shutter which pulls in front of the windshield or the side opening of the car in order to cut off the light. Such devices, while effective to some extent, introduce other hazards because they are usually opaque and consequently, reduce the field of vision of the operator.

Another condition which is a common source of annoyance and danger to motorists is encountered during night driving when the driver is subjected to sudden and frequent changes of illumination from the headlights of on-coming motor cars or from the glare of badly placed street lights, signs, etc. Often, there is a considerable amount of glare caused by reflection from wet pavement which is a source of potential danger because the driver of the car may be momentarily blinded or may be unable to see certain objects which, with proper illumination, he would normally see and avoid.

During recent years, the lenses of automobile headlights have sometimes been constructed of polarizing materials so that, to some extent, the hazard of night driving has been alleviated but any motorist realizes that the problem has not been entirely solved by the use of a single polarizing lens. The addition of polarizing devices to headlights and windshields operating on the principle of a Venetian blind have been suggested. The "slats" are made up of the polarizing material and are placed in horizontal position when not in use. These devices may be to some extent helpful, but obviously may be the source of additional danger in that they tend to obstruct the vision when the vanes are in horizontal position, that is, when the polarizing unit is not being utilized. Furthermore, they are subject to the same disadvantages as a single polarizing lens or element.

The conditions encountered during night driving are considered as typical of those conditions in which my invention is particularly advantageous. At night, the driver of an automobile, encountering an on-coming driver, finds that the amount of illumination in the highway between the two cars is roughly the sum of the amount of light reaching a given point from the headlights to each car. If the road illumination by one set of headlights is sufficient for the driver of the car, then the road may be over-illuminated during the period of time that the two cars approach each other closely. From the standpoint of safe driving, it is desirable to reduce the amount of illumination by the two cars as they approach one another and this should be possible without sacrificing safety. That this is feasible, is illustrated by the fact that most cars are equipped with dimming devices which reduce the amount of light at the will of the driver. These are usually controlled by a hand-or-foot-operated switch.

My invention provides a means for decreasing the hazards of night driving by two major means. First, it provides a means of maintaining the amount of light reaching the driver at a substantially constant value, at the same time eliminating glare reaching the driver's eyes, either directly from the source or by reflection. Second, the invention provides a means for reducing the amount of illumination emitted by the headlights of the car so equipped so that the approaching driver does not see the intense glare of the light nor does the light between the two cars increase to the same extent as they approach one another. As a consequence, the driver of a car so equipped does not find himself subjected to sudden changes in illumination, his eyes do not have to accustom themselves to a lesser amount of illumination after he has passed the approaching car, and the amount of light cast upon the road before him is maintained at a more nearly constant value so that he is never blinded and he is thus able to see to the full extent possible with the particular headlights he may be using. This minimizes or eliminates the hazards which are directly traceable to faulty illumination.

He is further protected since his own headlights will not blind the on-coming driver because the radiation from them may be reduced in proportion to the amount of light on the road. Moreover, the on-coming driver is not subjected to glare because the polarized light tends to eliminate glare.

My invention is illustrated in the accompanying drawings.

Figure 5 is another embodiment of the invention from a front elevation, and Figure 6 is a side view of the device shown in Figure 5.

Figure 7 is a schematic drawing of one means for operating the device, particularly, as shown in Figures 5 and 6.

Figure 1:
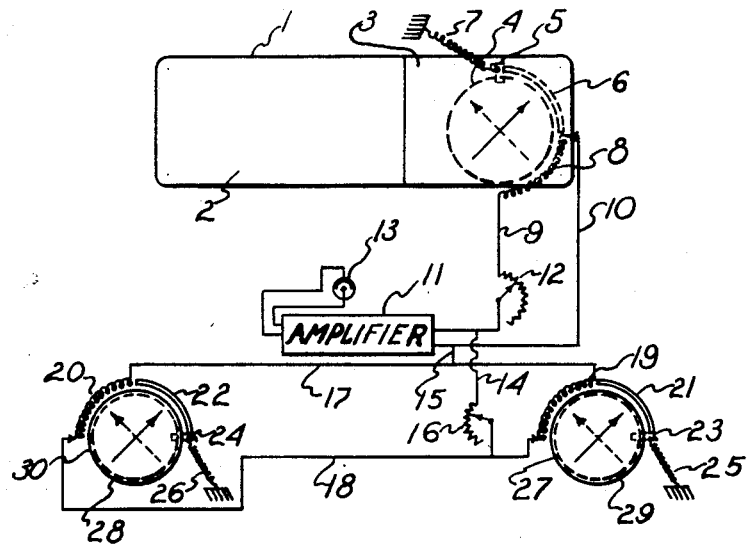
Figure 1 is a schematic illustration of one form of the device as it might be associated with an automobile.

Referring to Figure 1, the windshield may be divided into two parts, although this is not necessary and my invention broadly is not so limited. Part 2 may consist of the usual windshield glass and part 3 may be made of a polarizing element. As used herein, the term "polarizing element," refers to the assembly of polarizing elements superimposed, which form a part of the invention. It is within the scope of my invention that the polarizing unit may be superimposed upon the ordinary glass of the windshield or may be separated therefrom or may constitute the entire section of the windshield. The windshield may be held in the usual frame of an automobile, or any frame suitably designed for the purpose.

A second polarizing element 4 which is movable, is preferably placed behind the windshield. This means that its position would be inside the car relative to the windshield. The purpose of this is to protect the polarizing element and the moving parts associated therewith. The polarizing elements may be mountable on the car by any suitable means (not shown). The mechanism for example, may be concealed by and supported under the dashboard of the car, or under the hood. Attached to polarizing element 4 by means of bracket 5 is the armature of an electro-magnet 6 which may also be attached to spring 7, fastened to the frame of the car or the windshield. The spring tends to keep the armature and hence the rotatable polarizer in a desired predetermined position. Solenoid 8 is attached by leads 9 and 10 to an amplifier 11. In lead 9 may be a variable rheostat 12, by means of which a suitable light value may be selected as desired, above which the rotatable polarizer 4 is caused to operate.

The polarizing element 4 permits the driver to regulate the amount of light that may reach him during the time that the windshield is illuminated beyond a predetermined value. Attached to amplifier 11 by appropriate leads is photocell or phototube 13. The power source may be included in the amplifier assembly or it may be operated from the car battery and/or generator.

The operation of the unit is as follows:

As the car approaches a light source and as the illumination exceeds a predetermined maximum, an electric current is caused to flow and is amplified by amplifier 11. As the amount of light passes the predetermined maximum, the current flows through solenoid 8 causing the armature 6 to be drawn into the solenoid thereby causing polarizing element 4 to rotate. The degree of rotation may be set by the variable sliders attached to the solenoids, these being used to set the point at which the armature "bottoms" in the solenoid.

It is also within the scope of the invention, to use a reversible motor or the like, whereby the amount of light passing through the windshield may be held at a substantially constant value. The same is true of the headlights. This may be done by adapting a hook-up such as is shown in Figure 7, the motor being geared or otherwise operatively associated, to the rotating polarizer. In this case, the phototube is preferably positioned behind the polarizing unit. Thus, as an automobile approaches the headlights of another car, the amount of rotation of the polarizing element 4 will increase as the cars come closer together and maintain the illumination on the driver at an approximately constant value.

As soon as the cars pass, the rotating polarizer is instantaneously pulled back to its normal position and the driver has been subjected to no blinding glare from which his eyes must recover before normal vision is restored.

The normal position of the polarizing elements are usually parallel in respect to each other with the axis of transmission being parallel or at a comparatively slight angle, depending upon the will of the operator. This may be set by the operator by means (not shown) which may comprise a ratcheting device. If all the car windshields were equipped with this device, there would be no need to put it on the headlights, but since this is not the case, it may be used in combination with headlight control so that the latter too, is automatically controlled photoelectrically.

Amplifier 11 may be hooked to the headlight assembly by means of leads 14 and 15 attached respectively to leads 17 and 18, which in turn, are attached to solenoids 19 and 20. Lead 14 contains a variable rheostat 16 which may be manually adjusted to control the point at which the solenoids 19 and 20 will become sufficiently energized to attract armatures 21 and 22. The armatures 21 and 22 are attached to brackets 23 and 24 which may be attached to springs 25 and 26 which may be appropriately anchored. The brackets are attached to rotatable polarizers 29 and 30. The entire assembly may be housed in or attachable to an automobile headlight assembly. The polarizers attached to the headlights are shown as operating under the control of the same photoelectric device and amplifier as is used to control the light transmitted through the windshield. Although not equivalent, separate photoelectric devices may be used.

The units operate in the following manner:

When the headlights are burning, the polarizers are normally placed with their transmitting axis parallel to one another so as to permit transmission of a maximum amount of light to the roadway thus offering the driver of the car the maximum amount of road illumination. As the car approaches a light and the illumination exceeds a certain predetermined value, current flows through the phototubes, the amplifier and the appropriate leads, causing the electro-magnet attached to each of the headlights to function and thereby to rotate the polarizing element in relation to the fixed polarizing element. This reduces the amount of light which is permitted to pass through the headlights to the roadway. As a consequence, the amount of illumination in the road is not increased substantially beyond a predetermined maximum by virtue of the headlights equipped with these devices. Likewise, the amount of glare is substantially reduced.

It is apparent that the headlight appliances serve no useful purposes during day time driving; however, the windshield device is of great value, particularly when a driver is facing the sun or is driving under lighting conditions of extreme intensity, or is subjected to strong light reflections.

It is likewise within the scope of my invention that the polarizing units on the windshield should be movably attached to the windshield or frame of the car so that when desired, they can be moved out of range of the windshield in much the same manner as the conventional sunshields or visors are on present-day cars. It is also within the scope of the invention that when using the device of the last named character that both polarizing units be made into a unit which can be moved in toto from in front of the windshield.

It is within the scope of this invention that the unit may be pivoted in such a manner that it can be brought into position over a side window of an automobile thereby permitting only polarized light to enter a car. Although it is not shown, it is within the scope of the invention to supply an appropriate switch to turn off the element when it is not needed. If desired, separate photoelectric devices may be used to control the headlights independently from the windshield.

It will be apparent that this device can be applied insofar as individual units are concerned, to other fields. For example, the windshield device may be used on boats or in connection with vehicles traveling over snow, ice or water where strong lighting conditions may exist.

If desired, the unit may be placed with the polarizing axis in any desired position. For example, considerable glare may be encountered from the reflections of headlights from wet pavements and in this case, it may be desirable to have the normal axis of the polarizing unit at an angle from the horizontal. The rotating polarizing unit will accommodate increased amounts of glare in the manner previously described in connection with the more direct illumination of approaching headlights, street lights, etc.

It is within the scope of my invention that both polarizing elements may be rotatable. In this case, they are made to rotate in opposite directions; the advantage of this lies in the fact that the degree of rotation of either element can be kept at a minimum since to produce the same effect, half the rotation is needed for either element. The arrows on the polarizing elements in the illustrations are intended to indicate that separate polarizing elements make up the unit but should not be taken to mean, that the transmitting axes thereof are normally crossed.

Figure 2:
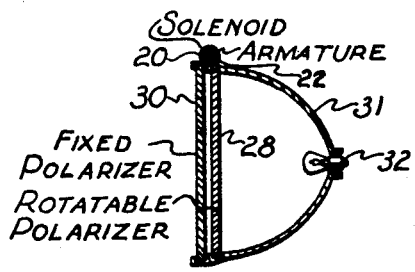
Figure 2 is a side elevation of an automobile headlight equipped with one form of my device.

Figure 2 is a simplified view in section of the one form of the device as it may be applied to the headlights of the automobile. The headlight, as illustrated, consists of reflector and frame 31 in which a source of illumination shown as an incandescent bulb 32 may be positioned by conventional means. A solenoid 29 and armature 22 are positioned adjacent the frame by any suitable means (not shown). A fixed polarizing element 30 and a rotatable element 28 are supported in the frame by suitable bearings and supports (not shown).

Figure 3:
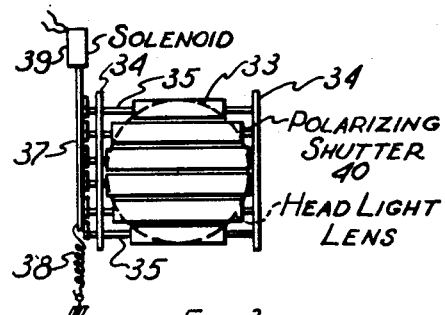
Figure 3 is an alternative but not equivalent device for equipping the headlights wherein a single polarizing element may be brought into play as needed, by photoelectric control.
Figure 4:
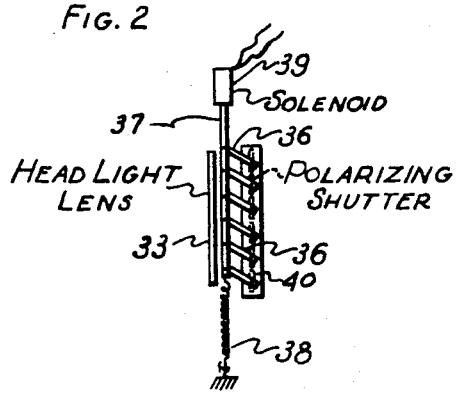
Figure 4 is a side elevation of the apparatus shown in Figure 3.

Referring to Figure 3, which is a front view in simplified form of another embodiment of the headlight device not equivalent to that illustrated in Figures 1 and 2, a headlight lens 33 is positioned in a suitable frame (not shown). A plurality of polarizing shutters 40 are supported by supports 34 which may be fixed by any suitable means to the frame of the car. The shutters are designed to rotate upon rods 35 which are attached to shaft 37 by means of pivots. The shaft, in turn, is attached to anchored spring 38. The upper end of the shaft 37 serves as the armature of an electro-magnet, the solenoid of which is designated as 39.

Thus, as current passes through the solenoid, it draws the armature upward in opposition to the pull of the spring 38, thereby, operating the pivoted shutters 40. The shutters 40 are closed when the phototube is illuminated, i. e., when current is passing. When no current passes, the shutters are brought into the open or horizontal position by the pull of spring 38.

This device is not equivalent to that illustrated in Figures 1 and 2, but it does permit a safety factor to be introduced when it is used on headlights in conjunction with the windshield device illustrated in Figure 1 for night driving.

Figures 5 and 6 illustrate a modification which is especially suitable for use on automobile windshields and the like. The mechanism may be located below the dashboard of the car.

All or a part of the shield may contain polarizing elements 41 and 42 having their transmission axis parallel. A photoelastic element 43 is placed between the polarizing elements. The elements may be made into a unit by inclusion in a suitable frame 44. Below the elements and engageable with the photoelastic element is cam 45 suitably geared and journaled by means of which force can be applied to the photoelastic element. This may be operated by a reversible motor or other reversible device, controlled by a photoelectric tube which may be positioned behind the polarizing unit, so as to maintain the light transmission substantially constant. A layer or gasket 57 of resilient material such as rubber may be placed between the cam and the photoelastic device or the cam may be made entirely or in part of rubber or other resilient material. This permits more ready control of the device. A lever having arms 58 and 59 may be attached to cam to operate limit switches 52 and 56 as hereinafter described.

Figure 7 is a schematic illustration of one method of operating the device shown in Figures 5 and 6. It may also be adapted to operate the rotatable polarizing unit on windshield or headlights by using a suitable gear drive on the rotatable element. The phototube 13 and amplifier 11 are attached to leads 46 and 47 attached in turn to relays 48 and 49. Switch 50 is normally in closed position. Motor 51 which is reversible, will thus run until limit switch 52 breaks the circuit. The limit switch may be operated by a lever or arm 58 attached, e. g., to the cam 45 or gear 53 to prevent further rotation. At this point, cam 45 is exerting substantially no pressure on the photoelastic element and the maximum of light may pass through the polarizing unit.

As phototube 13 sees more light than is desired the current passing actuates relay 48 pulling switch 50 open. The motor 51 is now capable of running in the reverse direction if energized. Since the relay 49 is designed to require more current to energize it than relay 48, the switch 54 remains open, which is its normal position. If lighting conditions are exactly right, the switches remain in this position.

As the intensity of light striking tube 13 is further increased, the current increases to a point where relay 49 is energized closing switch 54 and starting motor 51 in the reverse direction so as to rotate cam 45 through gears 53 and 55. The phototube should be located behind the polarizing unit so that the light striking it is the amount transmitted by the unit. As the cam presses on the photoelastic element, the plane polarized light striking it after passing through element 41 (assumed to be nearest the light source) is rotated somewhat by the photoelastic element and part of it is cut off by element 42. The net result is a decrease in the proportion of light transmitted relative to the total light striking the unit, which is to say that the light reaching the observer (and the phototube), remains about constant. As the motor continues to revolve the current passing will be reduced until it will no longer energize relay 49 and switch 54 opens again, shutting off the motor, but holding switch 50 open.

If the light on the tube becomes too great, the motor will revolve until limit switch 56 is opened, this being set, usually, at the maximum rotation of cam 45 where maximum pressure is exerted on the photoelastic element. This point is chosen at something less than complete cut-off of light transmitted. It serves largely as a safety device to prevent complete cut-off of light as well as damage to the equipment.

If the light decreases substantially, the relay 48 is no longer actuated and switch 50 will close, thereby causing the motor to reverse thus removing pressure from element 43 and allowing more light to come through.

The invention has been illustrated in several modifications, but it is understood that it applies to all equivalents thereof, and is not strictly limited to the devices shown.

I claim as my invention:

1. A device for controlling the amount of light received by the driver of a vehicle and for automatically dimming the headlight beam on said vehicle, comprisng a viewing device, means for attaching it in viewing position on said vehicle, a photoelectric device supported and positioned to receive light passing through said viewing device toward said driver's eyes and responsive to said light, said viewing device comprising a first polarizing element, and a second polarizing element rotatably mounted over the first polarizing element with the polarizing axes of both elements substantially parallel, power means engaging one of the polarizing elements for rotating it with respect to the other polarizing element, said power means responsive to and operatively controlled by said photoelectric device, adjusting means operatively associated with said photoelectric device and said power means for adjusting the degree of rotation of said rotatable polarizing element, dimming means positioned in front of the headlight beam of the vehicle, said dimming means comprising a pair of polarizing elements superimposed with substantially parallel polarizing axes, one of said elements being mounted for rotation, separate power means for said dimming means operatively mounted to rotate the last-mentioned rotatable polarizing element, said power means responsive to said photoelectric device thereby progressively decreasing the amount of light transmitted through said dimming means as the amount of light received by said photoelectric means increases, said power means associated with the dimming means further adapted and arranged for returning the polarizing elements to substantially parallel alignment of their polarizing axes after the light reaches a predetermined value.

2. A device for controlling the amount of light received by the driver of a vehicle, comprising a viewing device, means for attaching it in viewing position on said vehicle, a photoelectric device supported and positioned to receive light passing through said viewing device toward the driver's eyes and responsive to said light, said viewing device comprising a first polarizing element, and a second polarizing element rotatably mounted over the first polarizing element with the polarizing axes of both elements substantially parallel, power means engaging one of the polarizing elements for rotating it with respect to the other polarizing element, said power means responsive to and operatively controlled by said photoelectric device, adjusting means operatively associated with said photoelectric device and said power means for adjusting the degree of rotation of said rotatable polarizing element responsive to a predetermined light intensity.

3. A device for automatically and progressively dimming the headlights of a vehicle, comprising a photoelectric device mountable on said vehicle and positionable to receive light from sources in front of and directed toward said vehicle, a dimming means mountable in front of the headlight beam of the vehicle, said dimming means comprising a pair of polarizing elements superimposed with substantially parallel polarizing axes, one of said elements being mounted for rotation, power means operatively mounted to rotate the rotatable polarizing element, said power means responsive to and controlled by said photoelectric device to progressively decrease the amount of light transmitted through said dimming means as the amount of light received by said photoelectric means increases, said power means further adapted and arranged for returning the polarizing elements to substantially parallel alignment of their polarizing axes after the light reaches a predetermined value.

SAMUEL C. HURLEY, JR.

REFERENCES CITED

The following references are of record in the file of this patent:

UNITED STATES PATENTS

| Number | Name | Date |
| --- | --- | --- |
| 2,237,566 | Land | Apr. 8, 1941 |
| 2,311,840 | Land | Feb. 23, 1943 |
| 1,291,636 | Brodsky | Jan. 14, 1919 |
| 2,064,812 | Bouchard | Dec. 22, 1936 |
| 2,255,933 | Land | Sept. 16, 1941 |
| 2,230,262 | Pollack | Feb. 4, 1941 |
| 2,134,414 | Norcross | Oct. 25, 1938 |
| 1,854,892 | Ewend | Apr. 19, 1932 |
| 2,003,248 | Chilowsky | May 28, 1935 |

(References on following page)

| Number | Name | Date |
|---|---|---|
| 2,302,554 | Kingsbury | Nov. 17, 1942 |
| 2,362,832 | Land | Nov. 14, 1944 |
| 1,786,518 | Chambers | Dec. 30, 1930 |
| 1,999,527 | Ronning | Apr. 30, 1935 |
| 2,183,217 | Goldsmith | Dec. 12, 1939 |
| 2,029,170 | Hull | Jan. 28, 1936 |
| 947,490 | Gwozdz | Jan. 25, 1910 |
| 2,167,484 | Berry | July 25, 1939 |

FOREIGN PATENTS

| Number | Country | Date |
|---|---|---|
| 763,279 | France | Feb. 12, 1934 |
| 491,410 | Great Britain | Sept. 1, 1938 |